P. A. KEISTER.
RAILROAD WEEDER AND RESHOULDERING MACHINE.
APPLICATION FILED NOV. 16, 1921.

1,429,680. Patented Sept. 19, 1922.

Inventor
P. A. Keister
By E. B. McBath
Attorney

Patented Sept. 19, 1922.

1,429,680

UNITED STATES PATENT OFFICE.

PERRY ADAM KEISTER, OF CEDAR RAPIDS, IOWA.

RAILROAD WEEDER AND RESHOULDERING MACHINE.

Application filed November 16, 1921. Serial No. 515,689.

*To all whom it may concern:*

Be it known that I, PERRY A. KEISTER, a citizen of the United States, residing at Cedar Rapids, in the county of Linn and the State of Iowa, have invented certain new and useful Improvements in Railroad Weeders and Reshouldering Machines, of which the following is a specification.

This invention relates to a device mounted upon a wheeled truck or car and motor driven and which when moved along the rails of a track will cut the weeds and grass from the sides of the track embankment and throw the dirt inwardly and upwardly toward the ends of the ties.

The main object of the invention is to reshoulder the roadbed thereby repairing damages done by rains, winds and frosts, all of which combined tend to wear down the shoulder formed for the roadway. At present work of this kind is done by hand and I have found by actual tests that this device will do in an eight hour day the same amount of work requiring thirty five men when done by hand.

Figure 1:
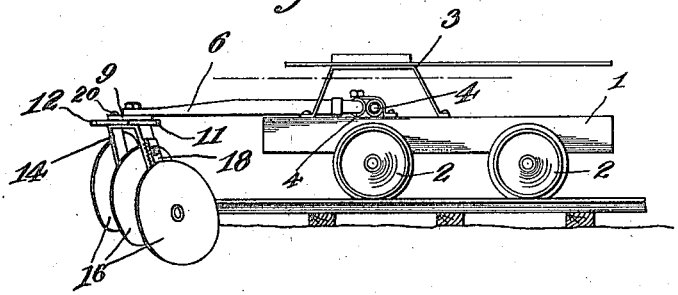
Figure 1 is a side elevation of the device mounted on a four wheel truck.
Figure 2:
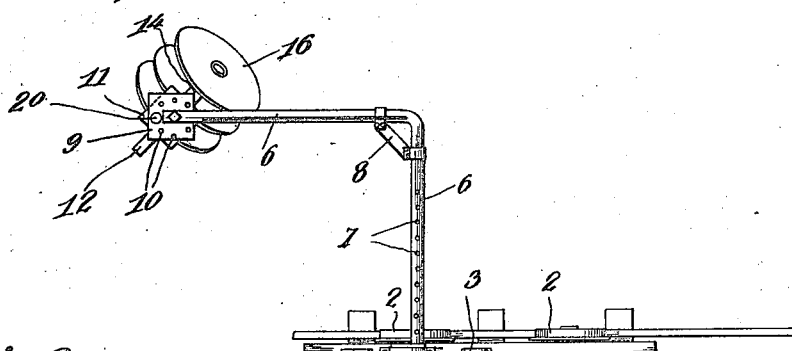
Figure 2 is a plan view of Figure 1, an engine platform being removed and parts being in section.
Figure 3:
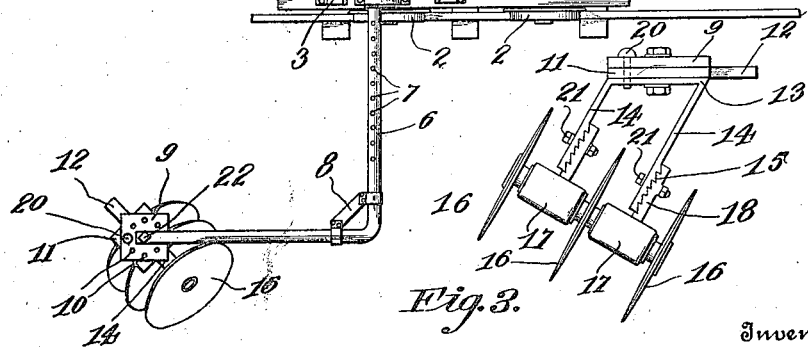
Figure 3 is a detail edge view of the cutting discs.

In the drawing 1 designates a suitable truck or car mounted on flanged track wheels 2 and a suitable engine platform 3 is mounted on said truck. Any type or form of engine can be employed that is suitable for the purpose, and it can be geared to the truck axles in any desired manner. The motive power for the truck does not form a part of this invention and the engine is therefore not shown.

The invention consists of the following described parts: Placed transversely across the truck are two parallel pipe sections 4 having suitable openings, said openings not appearing in the drawing as they are concealed by the heads of bolts to be described hereafter.

Fitting respectively into the pipes 4 are the inner end portions of angled pipe sections 6, said sections being adjustable in the pipes 4 and being provided with a series of perforations 7. Braces 8 are placed in the angles of the pipe sections 6. The outer forward ends of these pipe sections 6 are flattened down and are secured to plates 9 having a series of perforations 10. Under the plates 9 are plates 11 having projecting handle members 12 by which they may be rotated. Secured in any desired manner to the undersides of the plates 11 are bow portions of U-shaped members, the bow portions 13 being rigidly fastened to the plates 11, and the side members 14 are angled with respect to a perpendicular line dropped from the bow portion. As the plates carrying these U-shaped members are rotatable they may extend in any desired direction, depending on their adjustment. The inner faces of the side members are provided with ratchet teeth 15. Cutting discs 16, in two sets, three discs to a set, have hubs 17 carrying co-operating ratchet members 18. One set of discs is supported at the free end of each angled pipe section 6. Also that said angled sections are arranged on opposite sides of the car 1.

The parts are locked in adjusted position by means of pins 19 which are dropped through the openings at 5 in the members 4 and pass through perforations 7 in the pipe sections 6. And by pins 20 dropped through perforations 10 in the plates 9 and through a suitable opening in each plate 11, plates 9 and 11 being secured on a center pin or bolt 22 about which the plate 11 rotates. The co-operating ratchet members 15 and 18 are locked in place by bolts and nuts 21. By means of this construction the cutters may be adjusted laterally, or vertically, and each set as a whole can be rotated on an axis at right angles to that about which each individual disc turns, so that they may be set to throw the dirt at any desired angle with respect to the ties and track rails.

What I claim is:—

1. A device of the kind described comprising parallel tubular members, angled members adapted to partially telescope into the tubular members, and extending respectively from opposite ends of the tubular members, means for locking the second mentioned members in position, means for supporting a set of discs from the free end of each of the second mentioned members, discs supported by said means, the discs of each set being rotatable on a common axis and also the set rotatable as a whole about an axis at right angles to the axis of each individual disc.

2. In a device of the kind described, the combination with a car or truck, transverse pipe members carried thereby, angled pipe sections having their inner ends telescoping respectively in said first mentioned pipe members, said angled members being arranged on opposite sides of the car, a perforated plate carried by the outer end of each angled pipe section, lower plates rotatably secured to the first mentioned plates, a U-shaped member rigidly secured to each lower plate, means for locking the lower plates against rotation, and a set of rotatable discs adjustably carried in each of said U-shaped members, as and for the purpose set forth.

In testimony whereof I affix my signature.

PERRY ADAM KEISTER.